USO10647803B2

United States Patent
Ran et al.

(10) Patent No.: US 10,647,803 B2
(45) Date of Patent: May 12, 2020

(54) METHOD FOR PREPARING CONCRETE SUPERPLASTICIZER HAVING PHOSPHOROUS ACID GROUP AND USE THEREOF

(71) Applicants: SOBUTE NEW MATERIALS CO., LTD., Nanjing (CN); BOTE NEW MATERIALS TAIZHOU JIANGYAN CO., LTD., Nanjing (CN)

(72) Inventors: Qianping Ran, Nanjing (CN); Tao Wang, Nanjing (CN); Jiaping Liu, Nanjing (CN); Jianfeng Ma, Nanjing (CN); Shuai Qi, Nanjing (CN); Shimin Fan, Nanjing (CN); Yong Yang, Nanjing (CN)

(73) Assignees: SOBUTE NEW MATERIALS CO., LTD, Nanjing (CN); BOTE NEW MATERIALS TAIZHOU JIANGYAN CO., LTD, Nanjing (CN)

( * ) Notice: Subject to any disclaimer, the term of this patent is extended or adjusted under 35 U.S.C. 154(b) by 147 days.

(21) Appl. No.: 16/067,012

(22) PCT Filed: Nov. 7, 2016

(86) PCT No.: PCT/CN2016/104952
§ 371 (c)(1),
(2) Date: Jun. 28, 2018

(87) PCT Pub. No.: WO2017/113990
PCT Pub. Date: Jul. 6, 2017

(65) Prior Publication Data
US 2019/0002614 A1 Jan. 3, 2019

(30) Foreign Application Priority Data
Dec. 31, 2015 (CN) .......................... 2015 1 1028479

(51) Int. Cl.
| | | |
|---|---|---|
| C08F 230/02 | (2006.01) | |
| C08F 283/06 | (2006.01) | |
| C04B 24/24 | (2006.01) | |
| C04B 103/30 | (2006.01) | |
| C04B 103/32 | (2006.01) | |

(52) U.S. Cl.
CPC .......... *C08F 230/02* (2013.01); *C04B 24/246* (2013.01); *C08F 283/06* (2013.01); *C04B 2103/308* (2013.01); *C04B 2103/32* (2013.01); *C08F 2800/10* (2013.01)

(58) Field of Classification Search
CPC .. C08F 230/02; C08F 283/06; C08F 2800/10; C04B 24/246; C04B 2103/308; C04B 2103/32
USPC ......................................................... 524/502
See application file for complete search history.

(56) References Cited

U.S. PATENT DOCUMENTS

| | | | | |
|---|---|---|---|---|
| 5,246,620 A | * | 9/1993 | Gethoffer | ............. C11D 3/3761 252/186.26 |
| 2013/0231415 A1 | | 9/2013 | Page et al. | |

FOREIGN PATENT DOCUMENTS

| | | |
|---|---|---|
| CN | 101061151 | 10/2007 |
| CN | 101128495 | 2/2008 |
| CN | 101346345 | 1/2009 |
| CN | 200910154139.0 | 6/2010 |
| CN | 200910045437.6 | 7/2010 |
| CN | 201110001233.X | 6/2011 |
| CN | 201110297153.3 | 9/2011 |
| CN | 201110109261.3 | 10/2011 |
| CN | 201110377946.6 | 6/2012 |
| CN | 201110460995.6 | 6/2012 |
| CN | 201210104362.6 | 8/2012 |
| CN | 201210528905.7 | 4/2013 |
| CN | 201110448681.4 | 7/2013 |
| CN | 103596993 | 2/2014 |
| CN | 103641963 | 3/2014 |
| CN | 102439063 | 11/2014 |
| CN | 105713151 | 6/2016 |
| EP | 0444542 | 9/1991 |
| GB | 2157279 | 10/1985 |
| WO | 9408913 | 4/1994 |

* cited by examiner

*Primary Examiner* — William K Cheung
(74) *Attorney, Agent, or Firm* — Treasure IP Group, LLC

(57) ABSTRACT

The present invention discloses a method for preparing a concrete superplasticizer having a phosphorous acid group and a use of the concrete superplasticizer. The concrete superplasticizer having a phosphorous acid group according to the present invention is prepared by free radical copolymerization of a phosphorous-containing monomer A and a polyether macromonomer B. The concrete superplasticizer having a phosphorous acid group obtained in the present invention can effectively improve flowability of concrete and can retain good workability of concrete. The method is simple, economical and effective, and in particular, can be used for commercial mass production.

6 Claims, No Drawings

METHOD FOR PREPARING CONCRETE SUPERPLASTICIZER HAVING PHOSPHOROUS ACID GROUP AND USE THEREOF

CROSS REFERENCE TO RELATED APPLICATION

This application claims priority to a PCT application PCT/CN2016/104952 filed on Nov. 7, 2016, which in turn claims priority to a Chinese Application No. CN201511028479.0, filed on Dec. 31, 2015. The PCT and Chinese Applications are incorporated herein by reference in their entireties.

BACKGROUND OF THE INVENTION

Field of the Invention

The present invention belongs to the technical field of concrete admixtures, and relates to a concrete superplasticizer having a phosphorous acid group and a method for preparing the same.

Description of Related Art

With rapid economic growth in China, modern buildings present the development trend towards large-span and super high-rise buildings, and pose higher requirements on the properties such as strength and durability of concrete. Mixing with a high-performance polymer dispersant in concrete is one of most effective, most economical and most convenient technical approaches for reducing the cement content, increasing the utilization of industrial residues, and achieving high durability and improved properties of concrete.

At present, the high-performance polymer dispersant is mainly polycarboxylic acid polymer superplasticizer. These polycarboxylic acid polymers can increase the flowability of cement such that the cement content is decreased and that the concrete material has higher mechanical strength. Such a polycarboxylic acid polymer is also generally referred to as polycarboxylic acid water-reducing agent.

A series of technologies based on a polycarboxylic acid water-reducing agent have been developed over the past decade (CN200910045437, CN200910154139, CN201110001233, CN201110109261, CN201110297153, CN201110377946, CN201110448681, CN201110460995, CN201210104362, CN201210528905).

However, theoretical research and engineering application has shown that the polycarboxylic acid water-reducing agent suffers from the problem of poor compatibility for concrete materials. This compatibility issue is mainly reflected in fast slump loss in concrete, abnormal setting, slow increase in strength, increased shrinkage, and crack susceptibility and the like.

In order to address the problem of poor compatibility for concrete, engineering technologists and researchers, based on the above research theory, from the level of the molecular architecture of a water-reducing agent, introduce a phosphoric acid group having high adsorption. On the one hand, tolerance of the water-reducing agent itself to calcium ions in a cement slurry system is enhanced, and on the other hand, a phosphoric acid group itself has stronger charge attraction over a carboxyl group. Currently, related preparation of a water-reducing agent having a phosphoric acid group has been disclosed in several patents.

A patent document CN102439063B discloses a compound with at least one phosphonic acid terminal end containing straight chain polyglycerols. This compound, as a water-reducing agent, can effectively retain the slump flow of concrete. However, such a water-reducing agent has high production costs and may cause delay in setting, and the delay in setting increases as the usage amount of the additive increases.

A patent document CN103596993A discloses a copolymer having a gem-bisphosphonate group. Such polymers have lower sensitivity to clays and alkaline sulfates in cement, relative to a polycarboxylic acid water-reducing agent. However, this method uses $PCl_3$ as a reaction raw material, and $PCl_3$ is an easily hydrolysable and oxidizable substance, inappropriate for exposure to air, and difficult to store. Therefore, the phosphate water-reducing agent produced by this method faces difficulty in commercial mass production.

A patent document CN101128495A discloses a phosphorus-containing vinylic polymer as a cement dispersant. This phosphoric acid water-reducing agent is formed by aqueous free radical polymerization of a vinylic poly(alkylene oxide) compound with a phosphate-containing unsaturated monomer. This phosphoric acid-based water-reducing agent does not result in delay in setting time of concrete and can maintain good initial water-reducing ability. However, the monomer used for the phosphoric acid water-reducing agent is mainly a phosphate-based monomer, and such a monomer may suffer from hydrolysis under a basic environment of cement. In addition, this phosphate monomer has a complex preparation process, which is detrimental to industrial applications.

A patent document CN101061151A discloses a method for producing a polycondensated phosphate polymer based on an aromatic or heteroaromatic compound, and a use of the polymer in cement dispersion. Such a polycondensate is formed by polycondensation of an aromatic phosphate compound, an aldehyde and an aromatic compound with alkoxypolyether in the presence of an acid. The polycondensate has good water-reducing effect. However, an aqueous solution of the polycondensate water-reducing agent contains a large quantity of free formaldehyde, resulting in environmental pollution. In addition, the backbone of the polymer is mainly a hydrophobic aromatic ring, and the water-reducing agent has strong air-entraining effect. When the water-reducing agent has high air entrainment, it is highly detrimental for development in strength of concrete.

The patents above disclose different types of phosphoric acid-based water-reducing agents, improve the compatibility for concrete to some extent, and enhance the resistance of superplasticizers to clays and alkaline sulfates.

SUMMARY OF THE INVENTION

The existing concrete high-performance polycarboxylic acid water-reducing agents suffer from the compatibility issue, and the existing phosphoric acid group-related water-reducing agents have several disadvantages in production process. In view of the forgoing problems, the present invention provides a concrete superplasticizer having a phosphorous acid group and a method for preparing the same. The concrete superplasticizer having a phosphorous acid group according to the present invention can effectively improve flowability of concrete and can retain good workability of concrete. The method is simple, economical and effective, and in particular, can be used for commercial mass production. In addition, the resulting concrete superplasticizer having a phosphorous acid group has stable air content.

The concrete superplasticizer having a phosphorous acid group according to the present invention is an aqueous dispersion of a comb-like polymer, and the comb-like polymer uses a phosphorous acid adsorption group as a backbone and polyether as a side chain.

The method for preparing a concrete superplasticizer having a phosphorous acid group according to the present invention includes free radical copolymerization of a phosphorous-containing monomer A and a polyether macromonomer B, wherein the monomer A has a structure represented by a general formula (1):

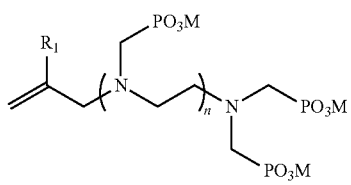

(1)

in which $R_1$ is H or $CH_3$, n is an integer from 0 to 6, M is a hydrogen atom, an alkali metal ion, an alkaline-earth metal ion, ammonium ion, or an organic amine group;

the monomer B is represented by a general formula (2):

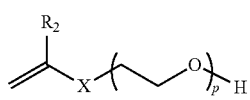

(2)

in which $R_2$ represents H or $CH_3$; X=O, $CH_2O$, or $CH_2CH_2O$; p represents an average addition mole number of ethylene oxide and is an integer from 20 to 90; and a molar ratio of the monomer A:the monomer B is 3 to 8:1.

The required molecular weight of the phosphorous acid type concrete superplasticizer according to the present invention is the same as a common molecular weight range of a polycarboxylic acid water-reducing agent of a comb-like structure in the prior art. The concrete superplasticizer having a phosphorous acid group according to the present invention has a weight average molecular weight ($M_W$) of 20000 to 80000.

The monomer A of a general formula (1) in the present invention may be prepared by well-known methods, specifically by reacting a chlorinated alkene and an amine compound in an aqueous phase.

The chlorinated alkene is allyl chloride and/or methyl allyl chloride.

The amine compound mainly includes ammonia, ethylenediamine, diethylenetriamine, triethylenetetramine, tetraethylenepentaamine, pentaethylenehexamine, hexaethyleneheptaamine, and polyethylenepolyamine.

The synthetic scheme of the monomer A is as follows:

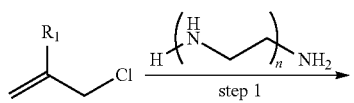

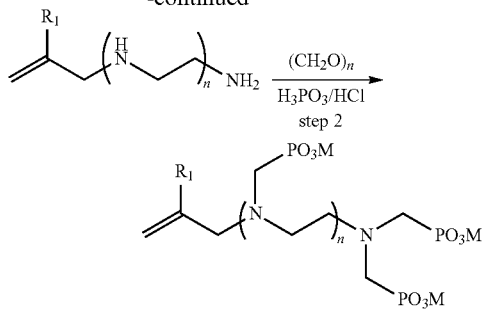

Step 1 is the classical nucleophilic substitution reaction. This is a well known basic reaction type in organic chemistry and those skilled in the art can deduce the major product of the substitution reaction according to the reaction mechanism, as shown above in the figure.

Step 2 is the phosphitylation reaction of amino groups, where the amino groups are all amino groups attached with H atoms, including primary and secondary amino groups. The phosphitylation reaction is also a well known basic reaction type, and has been reported in many patent documents (CN102439063B, WO94/08913). The resulting product is the raw material monomer A of the polymerization reaction.

The monomer B of a general formula (2) according to the present invention is an etheric unsaturated polyether macromonomer which is a common substance in the art, selected from vinyl polyethylene glycol ether, allyl polyethylene glycol ether, 3-buten-1-ol polyethylene glycol ether, methyl allyl polyethylene glycol ether, and 3-methyl-3-buten-1-ol polyethylene glycol ether, and a mixture thereof in any ratio.

Those skilled in the art can choose specific conditions of free radical polymerization, according to the polymerization activity of the monomers and the molecular weight of the target product, in conjunction with the prior art. In addition, to form more uniform distribution as possible of segments of the monomer A and segments of the monomer B in the polymer (such a product is generally considered to have better performance), it is desirable to use the addition manners of reactants below, that is, the method for preparing a concrete superplasticizer having a phosphorous acid group according to the present invention specifically includes the following process:

adding the monomer B and an oxidizing agent into a reaction container before the beginning of the reaction, to improve the conversion rate of the monomer B and the polymerization activity; and dropwise adding an aqueous solution of the monomer A, a chain transfer agent and a reducing agent to the reaction container after the beginning of the reaction.

The oxidizing agent and the reducing agent are water soluble to form a redox initiator system; the oxidizing agent is hydrogen peroxide at a weight concentration of no greater than 30%, and the reducing agent is selected from sodium bisulfate, sodium metabisulfite, sodium hypophosphate, Mohr's salt, L-ascorbic acid, isoascorbic acid, and sodium formaldehyde sulfoxylate.

The chain transfer agent is one of mercaptoethanol, mercaptoacetic acid, 2-mercaptopropionic acid, and 3-mercaptopropionic acid, or a mixture thereof in any ratio.

The usage amounts of the oxidizing agent, the reducing agent and the chain transfer agent are 2 to 10%, 0.5 to 5%, 0.5 to 5% of the total moles of monomers (A+B), respectively.

In implementing the present invention, the polymerization concentration and the polymerization temperature are controlled to be 30 to 60 wt % and 30 to 60° C., and the dropwise addition time of the monomer/reducing agent solution is controlled to be 2 to 6 h. After the dropwise addition is finished, the polymerization reaction time is controlled to be 4 to 8 h. Here, the polymerization concentration is a sum of weight percent concentrations of all the monomers in the mixed solution.

After the polymerization reaction is finished, the reaction product can be directly used as a main ingredient of a cement dispersant, and more preferably, is neutralized with a basic compound before use, to improve the storage stability of the product. Such a technique is well known in the art. The usage amount of the basic substance is selected to adjust the reaction product to a pH of 6 to 8. After neutralization, the phosphorous acid groups contained in the general formula above may be partially or completely converted into phosphites. The neutralization has no significant influence on the molecular weight of the superplasticizer having a phosphorous acid group, and is ignored in the present invention.

In another aspect of the present invention, also provided is a use of a concrete superplasticizer having a phosphorous acid group as a cement dispersant.

A conventional dosage (a dosage as a neat solid) of the concrete superplasticizer having a phosphorous acid group according to the present invention is 0.05% to 0.3% of the total weight of the cement concrete binder, and the optimal amount thereof needs to be determined by in situ concrete mixing experiments according to the actual engineering requirements.

The concrete superplasticizer having a phosphorous acid group according to the present invention may be used alone, and may also be used in mixture with at least one of aminosulfonic acid-based water-reducing agents, lignin-based ordinary water-reducing agents and existing polycarboxylate water-reducing agents known in the prior art, to improve the slump-retaining ability of water-reducing agent products in the prior art. Further, in addition to the known concrete water-reducing agents as mentioned above, functional admixtures such as air-entraining agent, swelling agent, retarder, hardening accelerator, tackifier, shrinkage reducing agent, and anti-foaming agent, may also be added according to the actual requirements.

The concrete superplasticizer having a phosphorous acid group according to the present invention can effectively improve flowability of concrete and retain good workability of concrete, and also has relatively low equivalent solid dosage. The preparation method is simple and effective, and can be used for commercial production.

DETAILED DESCRIPTION OF THE INVENTION

The present invention will be described in detail by way of examples, and these examples are merely illustrative and should not be construed as limiting the invention thereto. Those skilled in the art can change reagents, catalysts and reaction process conditions within the scope of the present invention. Any equivalent change or modification made according to the spirit and essence of the present invention shall fall within the protection scope of the present invention.

In the examples of the present invention, the number-average molecular weight of the polymer is determined by a gel permeation chromatography from Wyatt Technology Corporation. (gel column: Shodex SB806+803 columns in series; eluant: 0.1M $NaNO_3$ solution; mobile phase velocity: 0.8 ml/min; injection: 20 μl 0.5% aqueous solution; detector: Shodex RI-71 differential refractive index detector; standard: PEG GPC calibration standards (Sigma-Aldrich, molecular weight 1010000, 478000, 263000, 118000, 44700, 18600, 6690, 1960, 628, 232).

In all the application examples of the present invention, unless otherwise stated, the cement used is reference cement (P.O42.5), the sand is medium sand having a fineness modulus Mx=2.6, and the stone is continuously graded broken stone having a particle size of 5 to 20 mm. Air content and water-reducing rate are determined with reference to related provisions in GB8076-2008 "Concrete Admixtures". Determination of slump and slump loss is performed with reference to related provisions in JC473-2001 "Pumping Aid for Concrete".

Codes for compounds of monomer A in synthesis examples of the present invention and corresponding structural formulas are shown below:

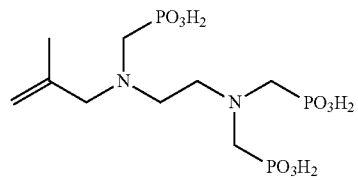

A-1

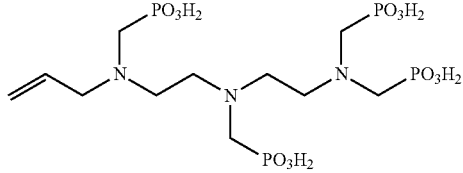

A-2

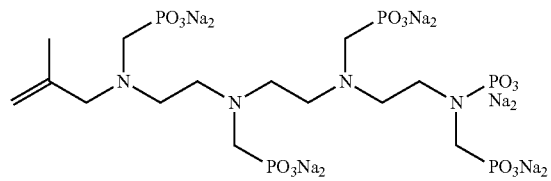

A-3

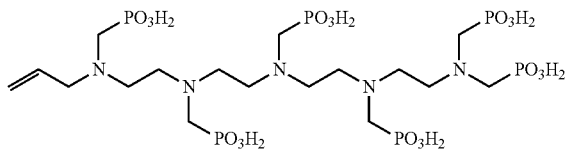

A-4

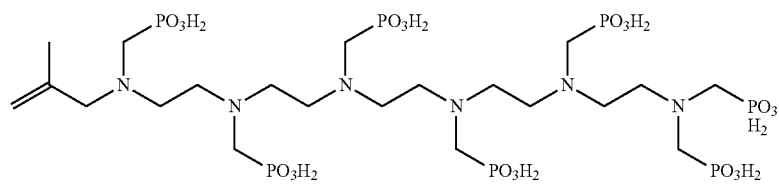

A-5

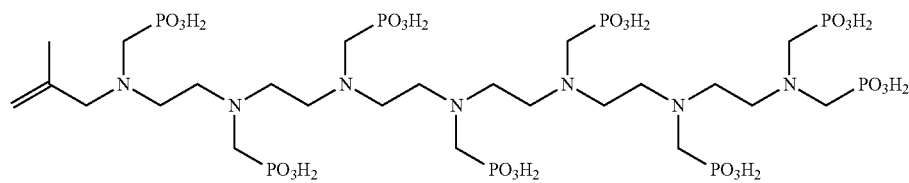

A-6

Synthesis Example 1: Preparation of Monomer A-1

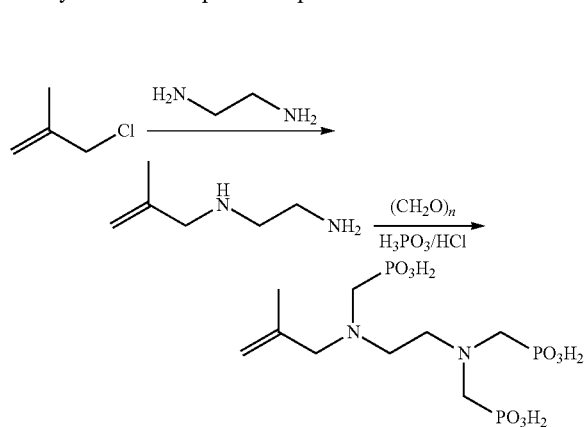

In a 1000 mL three-necked flask, provided with a condenser at the top, purged of oxygen by displacement with nitrogen and provided in a thermostated water bath, 1 mol methyl allyl chloride, 5 mol ethylenediamine and 500 mL water were added with magnetic stirring. The mixture was heated to 100° C. with stirring. After 12 h reaction time, a homogeneous solution was formed. The excess ethylenediamine and water were removed by a rotary evaporator, the solution was cooled, a methanol solution was added, and the ammonium salt was removed by filtration. Then, methanol was removed by distillation under reduced pressure. An almost pure unsaturated amine was obtained. 2 mol HCl and 500 mL water were added at room temperature and then heated to 80° C., and 3 mol H$_3$PO$_3$ as a solid and 3 mol formaldehyde as an aqueous solution (37%) were added and heated to 110° C. for 12 h. After the reaction was finished, the phosphorous acid monomer was precipitated by adding an excess of hot methanol, and the separated product was recrystallized with water to give a pure unsaturated phosphorous acid monomer A-1. Yield: 85%.

Synthesis Example 2: Preparation of Monomer A-2

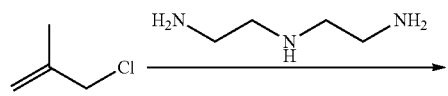

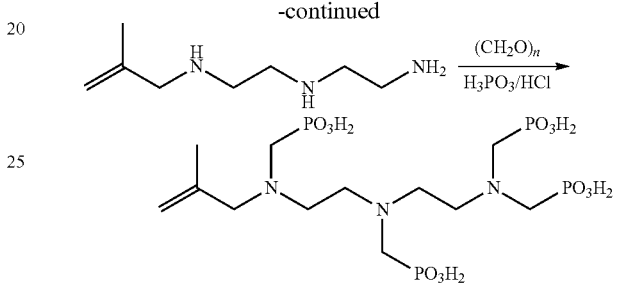

In a 1000 mL three-necked flask, provided with a condenser at the top, purged of oxygen by displacement with nitrogen and provided in a thermostated water bath, 1 mol methyl allyl chloride, 2 mol diethylenetriamine and 500 mL water were added with magnetic stirring. The mixture was heated to 100° C. with stirring. After 12 h reaction time, a homogeneous solution was formed. The mixture was cooled to room temperature. 6 mol HCl was added at room temperature and then heated to 80° C., and 8 mol H$_3$PO$_3$ as a solid and 8 mol formaldehyde as an aqueous solution (37%) were added and heated to 110° C. for 12 h. After the reaction was finished, the phosphorous acid monomer was precipitated by adding an excess of hot methanol, and the separated product was recrystallized with water to give a pure unsaturated phosphorous acid monomer A-2. Yield: 54%.

Synthesis Example 3: Preparation of Monomer A-6

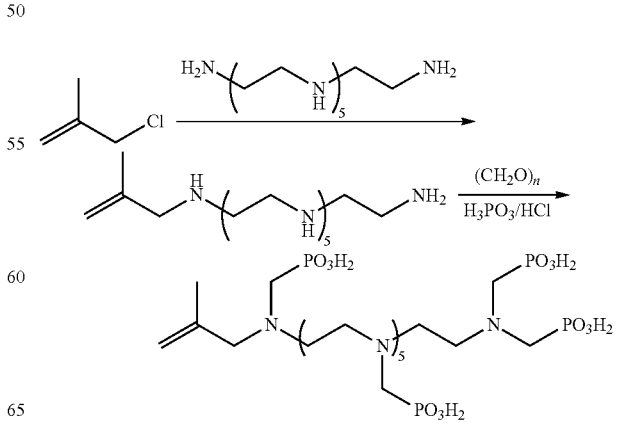

In a 1000 mL three-necked flask, provided with a condenser at the top, purged of oxygen by displacement with nitrogen and provided in a thermostated water bath, 1 mol methyl allyl chloride, 1 mol hexaethyleneheptaamine and 500 mL water were added with magnetic stirring. The mixture was heated to 100° C. with stirring. After 12 h reaction time, a homogeneous solution was formed. The mixture was cooled to room temperature. 7 mol HCl was added at room temperature and then heated to 80° C., and 8 mol $H_3PO_3$ as a solid and 8 mol formaldehyde as an aqueous solution (37%) were added and heated to 110° C. for 12 h. After the reaction was finished, the phosphorous acid monomer was precipitated by adding an excess of hot methanol, and the separated product was recrystallized with water to give a pure unsaturated phosphorous acid monomer A-6. Yield: 87%.

TABLE 1

Codes for example compounds of monomer B

| Monomer B | General formula (2) | B-1 | Vinyl polyethylene glycol (Mw 1000) |
|---|---|---|---|
| | | B-2 | Allyl polyethylene glycol (Mw 2000) |
| | | B-3 | Methyl allyl polyethylene glycol (Mw 3000) |
| | | B-4 | 3-methyl-3-buten-1-ol polyethylene glycol (Mw 4000) |

Example 1

In a glass reactor equipped with a thermometer, a stirrer, a dropping funnel, and a nitrogen gas inlet tube, 40 g deionized water was added and at the same time 20 g B-2 (0.01 mol) was added, the reaction container was purged with nitrogen gas while stirring and heated to 30° C. to dissolve the solids, and then 0.091 g (at a weight concentration of 30%) hydrogen peroxide was added and uniformly stirred. Then, 11.07 g A-1 (0.03 mol), 0.184 g mercaptoacetic acid and 15 g water were mixed and stirred to form a uniform aqueous monomer solution, it was dropwise added to the reactor over 2 h, and at the same time 15 g of an aqueous solution containing 0.035 g L-ascorbic acid was dropwise added over about 2 h. After the dropwise additions were completed, the reaction was incubated for 2 h, cooled to room temperature, and neutralized by addition of a base to a pH 6.8, to give a yellow clear liquid having a solid content of 30.7%, Mw: 30,000.

Example 2

In a glass reactor equipped with a thermometer, a stirrer, a dropping funnel, and a nitrogen gas inlet tube, 50 g deionized water was added and at the same time 30 g B-3 (0.01 mol) was added, the reaction container was purged with nitrogen gas while stirring and heated to 45° C. to dissolve the solids, and then 0.31 g (at a weight concentration of 30%) hydrogen peroxide was added and uniformly stirred. Then, 41.54 g A-2 (0.08 mol), 0.212 g 2-mercaptopropionic acid, 0.190 g mercaptoacetic acid and 20 g water were mixed and stirred to form a uniform aqueous monomer solution, it was dropwise added to the reactor over 6 h, and at the same time 20 g of an aqueous solution containing 0.053 g sodium formaldehyde sulfoxylate was dropwise added over about 6 h. After the dropwise additions were completed, the reaction was incubated for 2 h, cooled to room temperature, and neutralized by addition of a base to a pH 7.2, to give a yellow clear liquid having a solid content of 44.4%, Mw: 38,000.

Example 3

In a glass reactor equipped with a thermometer, a stirrer, a dropping funnel, and a nitrogen gas inlet tube, 50 g deionized water was added and at the same time 40 g B-4 (0.01 mol) was added, the reaction container was purged with nitrogen gas while stirring and heated to 50° C. to dissolve the solids, and then 0.23 g (at a weight concentration of 30%) hydrogen peroxide was added and uniformly stirred. Then, 35.60 g A-3 (0.04 mol), 0.184 g mercaptoacetic acid and 20 g water were mixed and stirred to form a uniform aqueous monomer solution, it was dropwise added to the reactor over 4 h, and at the same time 20 g of an aqueous solution containing 0.18 g L-ascorbic acid was dropwise added over about 4 h. After the dropwise additions were completed, the reaction was incubated for 2 h, cooled to room temperature, and neutralized by addition of a base to a pH 7.0, to give a yellow clear liquid having a solid content of 45.8%, Mw: 71,000.

Example 4

In a glass reactor equipped with a thermometer, a stirrer, a dropping funnel, and a nitrogen gas inlet tube, 30 g deionized water was added and at the same time 10 g B-1 (0.01 mol) was added, the reaction container was purged with nitrogen gas while stirring and heated to 60° C. to dissolve the solids, and then 0.34 g (at a weight concentration of 30%) hydrogen peroxide was added and uniformly stirred. Then, 39.67 g A-4 (0.05 mol), 0.223 g 3-mercaptopropionic acid, and 10 g water were mixed and stirred to form a uniform aqueous monomer solution, it was dropwise added to the reactor over 5 h, and at the same time 10 g of an aqueous solution containing 0.22 g sodium formaldehyde sulfoxylate was dropwise added over about 5 h. After the dropwise additions were completed, the reaction was incubated for 2 h, cooled to room temperature, and neutralized by addition of a base to a pH 6.5, to give a yellow clear liquid having a solid content of 50.2%, Mw: 42,000.

Example 5

In a glass reactor equipped with a thermometer, a stirrer, a dropping funnel, and a nitrogen gas inlet tube, 40 g deionized water was added and at the same time 20 g B-2 (0.01 mol) was added, the reaction container was purged with nitrogen gas while stirring and heated to 60° C. to dissolve the solids, and then 0.47 g (at a weight concentration of 30%) hydrogen peroxide was added and uniformly stirred. Then, 56.67 g A-5 (0.06 mol), 0.193 g mercaptoacetic acid, and 10 g water were mixed and stirred to form a uniform aqueous monomer solution, it was dropwise added to the reactor over 4 h, and at the same time 10 g of an aqueous solution containing 0.29 g sodium formaldehyde sulfoxylate was dropwise added over about 4 h. After the dropwise additions were completed, the reaction was incubated for 2 h, cooled to room temperature, and neutralized by addition of a base to a pH 7.1, to give a yellow clear liquid having a solid content of 54.5%, Mw: 22,000.

Example 6

In a glass reactor equipped with a thermometer, a stirrer, a dropping funnel, and a nitrogen gas inlet tube, 50 g deionized water was added and at the same time 30 g B-3 (0.01 mol) was added, the reaction container was purged with nitrogen gas while stirring and heated to 40° C. to dissolve the solids, and then 0.63 g (at a weight concentration of 30%) hydrogen peroxide was added and uniformly stirred. Then, 75.71 g A-6 (0.07 mol), 0.170 g 2-mercaptopropionic acid and 20 g water were mixed and stirred to form a uniform aqueous monomer solution, it was dropwise added to the reactor over 3 h, and at the same time 10 g of an aqueous solution containing 0.63 g L-ascorbic acid was dropwise added over about 3 h. After the dropwise additions were completed, the reaction was incubated for 2 h, cooled to room temperature, and neutralized by addition of a base to a pH 7.4, to give a yellow clear liquid having a solid content of 57.25%, Mw: 69,000.

Example 7

In a glass reactor equipped with a thermometer, a stirrer, a dropping funnel, and a nitrogen gas inlet tube, 50 g deionized water was added and at the same time 40 g B-4 (0.01 mol) was added, the reaction container was purged with nitrogen gas while stirring and heated to 40° C. to dissolve the solids, and then 0.54 g (at a weight concentration of 30%) hydrogen peroxide was added and uniformly stirred. Then, 19.8 g A-1 (0.05 mol), 0.064 g 3-mercaptopropionic acid and 20 g water were mixed and stirred to form a uniform aqueous monomer solution, it was dropwise added to the reactor over 5 h, and at the same time 15 g of an aqueous solution containing 0.42 g L-ascorbic acid was dropwise added over about 5 h. After the dropwise additions were completed, the reaction was incubated for 2 h, cooled to room temperature, and neutralized by addition of a base to a pH 7.5, to give a yellow clear liquid having a solid content of 41.7%, Mw: 55,000.

Example 8

In a glass reactor equipped with a thermometer, a stirrer, a dropping funnel, and a nitrogen gas inlet tube, 40 g deionized water was added and at the same time 10 g B-1 (0.01 mol) was added, the reaction container was purged with nitrogen gas while stirring and heated to 40° C. to dissolve the solids, and then 0.56 g (at a weight concentration of 30%) hydrogen peroxide was added and uniformly stirred. Then, 20.77 g A-2 (0.04 mol), 0.027 g 3-mercaptopropionic acid and 10 g water were mixed and stirred to form a uniform aqueous monomer solution, it was dropwise added to the reactor over 5 h, and at the same time 10 g of an aqueous solution containing 0.44 g L-ascorbic acid was dropwise added over about 5 h. After the dropwise additions were completed, the reaction was incubated for 2 h, cooled to room temperature, and neutralized by addition of a base to a pH 7.5, to give a yellow clear liquid having a solid content of 34.63%, Mw: 21,000.

Comparative Example 1

In a glass reactor equipped with a thermometer, a stirrer, a dropping funnel, and a nitrogen gas inlet tube, 30 g deionized water was added and at the same time 40 g B-4 (0.01 mol) was added, the reaction container was purged with nitrogen gas while stirring and heated to 40° C. to dissolve the solids, and then 0.54 g (at a weight concentration of 30%) hydrogen peroxide was added and uniformly stirred. Then, 7.92 g A-1 (0.02 mol), 0.223 g 3-mercaptopropionic acid and 20 g water were mixed and stirred to form a uniform aqueous monomer solution, it was dropwise added to the reactor over 5 h, and at the same time 15 g of an aqueous solution containing 0.37 g L-ascorbic acid was dropwise added over about 5 h. After the dropwise additions were completed, the reaction was incubated for 2 h, cooled to room temperature, and neutralized by addition of a base to a pH 7.5, to give a yellow clear liquid having a solid content of 42.9%, Mw: 43,000.

Comparative Example 2

In a glass reactor equipped with a thermometer, a stirrer, a dropping funnel, and a nitrogen gas inlet tube, 50 g deionized water was added and at the same time 30 g B-3 (0.01 mol) was added, the reaction container was purged with nitrogen gas while stirring and heated to 45° C. to dissolve the solids, and then 0.17 g (at a weight concentration of 30%) hydrogen peroxide was added and uniformly stirred. Then, 46.73 g A-2 (0.09 mol), 0.0368 g mercaptoacetic acid, and 20 g water were mixed and stirred to form a uniform aqueous monomer solution, it was dropwise added to the reactor over 6 h, and at the same time 20 g of an aqueous solution containing 0.047 g sodium formaldehyde sulfoxylate was dropwise added over about 6 h. After the dropwise additions were completed, the reaction was incubated for 2 h, cooled to room temperature, and neutralized by addition of a base to a pH 7.2, to give a yellow clear liquid having a solid content of 46.1%, Mw: 52,000.

Comparative Example 3

In a glass reactor equipped with a thermometer, a stirrer, a dropping funnel, and a nitrogen gas inlet tube, 200 g deionized water was added and at the same time 30 g B-3 (0.01 mol) and 43.26 g A-6 (0.04 mol) were added, the reaction container was purged with nitrogen gas while stirring and heated to 30° C. to dissolve the solids, and then 0.28 g (at a weight concentration of 30%) hydrogen peroxide was added and uniformly stirred. Then, 43.26 g A-6 (0.04 mol), 0.16 g 3-mercaptopropionic acid and 40 g water were mixed and stirred to form a uniform aqueous monomer solution, it was dropwise added to the reactor over 3 h, and at the same time 40 g of an aqueous solution containing 0.352 g L-ascorbic acid was dropwise added over about 3 h. After the dropwise additions were completed, the reaction was incubated for 2 h, and neutralized by addition of a base to a pH 6.8, to give a yellow clear liquid having a solid content of 20.89%, Mw: 18,000.

Application Example 1

Setting time, air content and slump tests: the air content was determined with reference to related test methods in GB8076-2008—"Concrete Admixtures"; the slump and changes in slump over 30 min of fresh concretes formulated with the products of the present invention and two commercial high-performance slump-retaining agents were determined with reference to related methods in JC473-2001—"Pumping Aid for Concrete", where the dosage of the copolymer was constant at 0.12% of the amount of cement. The experimental results are shown in Table 2.

TABLE 2

Concrete Tests

| No. | Solid content (%) | Air content (%) | Setting time (h:min) Initial setting | Setting time (h:min) Final setting | Slump and slump flow of concrete 0 min | Slump and slump flow of concrete 30 min |
|---|---|---|---|---|---|---|
| Example 1 | 0.12 | 3.7 | 7:45 | 9:38 | 22.5/54 | 18.5/42 |
| Example 2 | 0.12 | 3.8 | 7:10 AM | 9:24 AM | 24.0/54 | 17.0/38 |
| Example 3 | 0.12 | 4.1 | 7:25 AM | 9:40 AM | 25.5/61 | 17.5/36 |
| Example 4 | 0.12 | 4.0 | 7:13 AM | 9:05 AM | 24.5/56 | 15.0/33 |
| Example 5 | 0.12 | 4.2 | 7:15 AM | 9:18 AM | 25.5/58 | 15.5/34 |
| Example 6 | 0.12 | 4.7 | 7:55 AM | 9:56 AM | 25.0/57 | 16.5/35 |
| Example 7 | 0.12 | 4.5 | 7:36 AM | 9:26 AM | 24.5/55 | 18.0/41 |
| Example 8 | 0.12 | 4.2 | 7:19 AM | 9:15 AM | 23.4/55 | 17.5/39 |
| Comparative Example 1 | 0.14 | 4.0 | 7:23 AM | 9:12 AM | 19.5/40 | 13.5/— |
| Comparative Example 2 | 0.14 | 5.1 | 7:26 AM | 9:14 AM | 20.1/41 | 11.5/— |
| Comparative Example 3 | 0.14 | 4.0 | 7:34 AM | 9:18 AM | 19.5/40 | 12.5/— |

It is indicated from the above experiments that the concrete superplasticizer having a phosphorous acid group according to the present invention can result in excellent workability of concrete at a low dosage. The comparative examples 1 to 3 outside the scope of the invention suffer from the disadvantages of relatively high dosage and insufficient slump-retaining property of concrete.

What is claimed is:

1. A method for making a cement concrete binder, comprising using a concrete superplasticizer having a phosphorous acid group at a concentration of 0.05%-0.3% of the total weight of the cement concrete binder, wherein the the concrete superplasticizer having a phosphorous acid group is prepared by the following method, comprising performing a free radical copolymerization between a phosphorous-containing monomer A and a polyether macromonomer B, wherein the monomer A has a structure represented by a general formula (1):

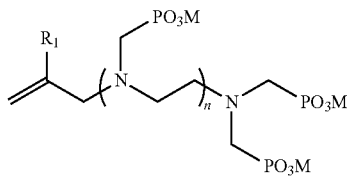

(1)

in which $R_1$ is H or $CH_3$, n is an integer from 0 to 6, M is a hydrogen atom, an alkali metal ion, an alkaline-earth metal ion, ammonium ion, or an organic amine group;

the monomer B is represented by a general formula (2):

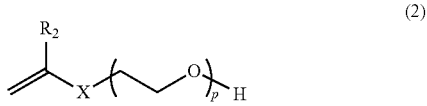

(2)

in which $R_2$ represents H or $CH_3$; X=O, $CH_2O$, or $CH_2CH_2O$; p represents an average addition mole number of ethylene oxide and is an integer from 20 to 90; and a molar ratio of the monomer A:the monomer B is 3 to 8:1.

2. The method of claim 1, wherein the concrete superplasticizer having a phosphorous acid group has a weight average molecular weight ($M_w$) of 20000 to 80000.

3. The method of claim 1, wherein the monomer A is prepared by reacting a chlorinated alkene and an amine compound in an aqueous phase; wherein the chlorinated alkene is allyl chloride and/or methyl allyl chloride; and the amine compound is ammonia, ethylenediamine, diethylenetriamine, triethylenetetramine, tetraethylenepentaamine, pentaethylenehexamine, hexaethyleneheptaamine, or polyethylenepolyamine.

4. The method of claim 3, wherein the synthetic scheme of the monomer A is as follows:

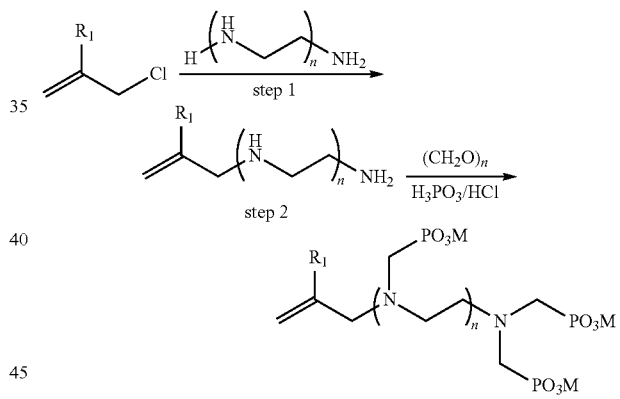

wherein step 1 is the classical nucleophilic substitution reaction; and step 2 is the phosphitylation reaction of amino groups, wherein the amino groups are all amino groups attached with H atoms, including primary and secondary amino groups.

5. The method of claim 1, wherein the monomer B is an etheric unsaturated polyether macromonomer, selected from vinyl polyethylene glycol ether, allyl polyethylene glycol ether, 3-buten-1-ol polyethylene glycol ether, methyl allyl polyethylene glycol ether, and 3-methyl-3-buten-1-ol polyethylene glycol ether, and a mixture thereof in any ratio.

6. The method of claim 1, comprising the steps of:

adding the monomer B and an oxidizing agent into a reaction container before beginning of the free radical copolymerization reaction, dropwise adding an aqueous solution of the monomer A, a chain transfer agent and a reducing agent to the reaction container after the beginning of the free radical copolymerization reaction;

wherein
- the oxidizing agent and the reducing agent are water soluble to form a redox initiator system;
- the oxidizing agent is hydrogen peroxide at a weight concentration of no greater than 30%, and the reducing agent is selected from sodium bisulfite, sodium metabisulfite, sodium hypophosphate, Mohr's salt, L-ascorbic acid, isoascorbic acid, and sodium formaldehyde sulfoxylate;
- the chain transfer agent is one of mercaptoethanol, mercaptoacetic acid, 2-mercaptopropionic acid, and 3-mercaptopropionic acid, or a mixture thereof in any ratio;
- the amount of the oxidizing agent, the reducing agent and the chain transfer agent used are 2 to 10%, 0.5 to 5%, 0.5 to 5% of the total moles of monomers (A+B), respectively;
- the polymerization concentration and the polymerization temperature are controlled to be 30 to 60 wt % and 30 to 60° C.;
- the dropwise addition time of the monomer/reducing agent solution is controlled to be 2 to 6h;
- the polymerization concentration is a sum of weight percent concentrations of all the monomers in the mixed solution;
- after the dropwise addition is finished, the polymerization reaction time is controlled to be 4 to 8h; and
- the polymerization reaction is finished, the concrete superplasticizer having a phosphorous acid group is obtained.

* * * * *